United States Patent [19]

Fukuda et al.

[11] Patent Number: 5,057,482
[45] Date of Patent: Oct. 15, 1991

[54] CATALYTIC COMPOSITE FOR PURIFYING EXHAUST GASES AND A METHOD FOR PREPARING THE SAME

[75] Inventors: Hiroshi Fukuda, Nara; Ikuo Matsumoto; Kenji Tabata, both of Ikoma, all of Japan

[73] Assignee: Matsushita Electric Industrial Co., Ltd., Osaka, Japan

[21] Appl. No.: 447,272

[22] Filed: Dec. 7, 1989

[30] Foreign Application Priority Data

Dec. 15, 1988 [JP] Japan ................. 63-317483
Dec. 15, 1988 [JP] Japan ................. 63-317484
Jun. 30, 1989 [JP] Japan ................. 1-170008

[51] Int. Cl.$^5$ ................. B01J 32/00; B01J 35/06
[52] U.S. Cl. ................. 502/303; 502/304; 502/324; 502/325; 502/328; 502/331; 502/439; 502/525; 502/527
[58] Field of Search ........ 502/439, 527, 324, 525, 502/303, 304, 325, 328, 331

[56] References Cited

U.S. PATENT DOCUMENTS

| 3,560,408 | 2/1971 | Kiehl et al. | 502/527 X |
| 3,691,097 | 9/1972 | Stiles et al. | 502/241 X |
| 3,697,447 | 10/1972 | Bettinardi | 502/527 X |
| 3,843,561 | 10/1974 | Sobel | 252/465 |
| 3,912,658 | 10/1975 | Kaneko et al. | 252/455 |
| 3,972,834 | 8/1976 | Washbourne | 502/527 X |
| 4,122,041 | 10/1978 | Mahler | 252/449 |
| 4,175,153 | 11/1979 | Dobo et al. | 428/398 |
| 4,189,404 | 2/1980 | Keith et al. | 252/462 |
| 4,520,124 | 5/1985 | Abe et al. | 502/527 X |
| 4,608,361 | 8/1986 | Kanamori et al. | 502/527 X |
| 4,772,455 | 9/1988 | Izumi et al. | 423/210 |
| 4,842,954 | 6/1989 | Cyron et al. | 428/593 |

FOREIGN PATENT DOCUMENTS

| 67895/74 | 10/1975 | Australia . |
| 67896/74 | 10/1975 | Australia . |
| 67897/74 | 10/1975 | Australia . |
| 0089199 | 9/1983 | European Pat. Off. . |
| 0270856 | 6/1988 | European Pat. Off. . |
| 2376698 | 8/1978 | France . |
| WO86/04525 | 8/1986 | PCT Int'l Appl. . |
| 2026467 | 2/1980 | United Kingdom . |

*Primary Examiner*—W. J. Shine
*Attorney, Agent, or Firm*—Panitch Schwarze Jacobs & Nadel

[57] ABSTRACT

A catalytic composite for purifying exhaust gases is disclosed which comprises ceramic fibers, oxidation catalysts supported on the surface of the ceramic fibers and in the interstices between the ceramic fibers, and inorganic binders for binding the oxidation catalysts to the ceramic fibers, the catalytic composite being provided with vent holes for the passage of exhaust gases. Also disclosed is a method for preparing the catalytic composite.

23 Claims, 2 Drawing Sheets

CATALYTIC COMPOSITE FOR PURIFYING EXHAUST GASES AND A METHOD FOR PREPARING THE SAME

BACKGROUND OF THE INVENTION

1. Field of the Invention

The present invention relates to a catalytic composite for purifying exhaust gases and a method for preparing the catalytic composite. More particularly, it relates to a catalytic composite capable of completely burning unburnt portions of hydrocarbons and carbon monoxide to decompose into carbon dioxide and water, the hydrocarbons and carbon monoxide being released from combustion equipment, automobiles, cooking utensils, and others using fuel such as petroleum, gasoline, or combustion gas.

2. Description of the Prior Art

As a catalytic composite for purifying exhaust gases, which converts hydrocarbon and carbon monoxide into carbon dioxide and steam in the coexistence of air, for example, a ceramic honeycomb structure is known, which is obtained by forming and calcining ceramic powder such as silica and alumina, and provided with a catalyst made of noble metals such as platinum, rhodium, or palladium. As the material for this ceramic honeycomb structure, cordierite composed mainly of alumina, silica, and magnesia is used from the viewpoint of durability. Since this cordierite is, however, high in density and is small in surface area, it is not suitable as the carrier of the catalyst. Therefore, to obtain a wide surface area, a coating layer with a wide surface area made of, for example, fine alumina particles is formed on the surface of cordierite. The noble metal catalyst is supported on the coating layer, resulting in a catalytic composite for purifying exhaust gases. Recently, perovskite-type compound oxides may be used as the catalyst instead of the noble metals. That is, on the surface of the ceramic honeycomb structure, the catalyst of perovskite-type compound oxides is supported together with an inorganic binder. In these examples, the catalyst is later supported on the surface of the ceramic honeycomb structure which was formed and processed.

In these catalytic composites for purifying the exhaust gases, however, since the catalyst is present only on the surface of the ceramic honeycomb structure, the area with the catalytic function is small. Besides, in cases where metal oxides are used as the catalyst, since the particle size thereof is larger as compared with the noble metal catalyst, the area with the catalytic function is further reduced. Therefore, when treating a large volume of exhaust gases, a sufficient catalytic activity cannot be obtained unless the load is reduced by increasing the size of the catalytic composite or the temperature of the catalytic composite is raised. Also, in the conventional ceramic honeycomb structure, the coating layer and catalyst are inferior in adhesion and hence they often peel off during use, lowering the catalytic performance. The lowering of adhesion may be improved by the use of an inorganic binder. When a large amount of inorganic binder is used, however, it may decrease the surface area of the coating layer; it may cover the catalyst surface; and it may react with the catalyst, thereby lowering the catalytic performance. When preparing these catalytic composites for purifying exhaust gases, three steps are required, that is, a step of forming and calcining a ceramic honeycomb structure, a step of forming a coating layer, and a step of allowing the catalyst to be supported. These steps are complicated and inferior in productivity, which may result in higher cost.

SUMMARY OF THE INVENTION

The catalytic composite for purifying exhaust gases of this invention, which overcomes the above discussed and numerous other disadvantages and deficiencies of the prior art, comprises ceramic fibers, oxidation catalysts supported on the surface of the ceramic fibers and in the interstices between the ceramic fibers, and inorganic binders for binding the oxidation catalysts to the ceramic fibers, the catalytic composite for purifying exhaust gases being provided with vent holes for the passage of exhaust gases.

In a preferred embodiment, the above-mentioned catalytic composite is of honeycomb structure.

In a preferred embodiment, the oxidation catalysts comprise perovskite-type compound oxides of the formula $ABO_3$, where A is selected from the group consisting of lanthanum (La), strontium (Sr), and cerium (Ce), and B is selected from the group consisting of cobalt (Co) and manganese (Mn).

In a preferred embodiment, the oxidation catalysts comprise delafosite-type compound oxides of the formula $ABQ_2$ where A is copper (Cu) and B is selected from the group consisting of cobalt (Co) and manganese (Mn).

In a preferred embodiment, the oxidation catalysts are composed of at least one metal oxide of copper (Cu), manganese (Mn), and cobalt (Co).

In a preferred embodiment, the ceramic fibers are made of at least one selected from the group consisting of alumina and silica.

In a preferred embodiment, the inorganic binders are composed mainly of at least one selected from the group consisting of alumina, silica, and zirconia.

A method for preparing a catalytic composite for purifying exhaust gases of this invention, comprises the steps of making a crude ceramic sheet from a mixed slurry of ceramic fibers and organic binders by the use of a paper-making method; calcining the crude ceramic sheet at the decomposition temperature of the organic binders to form a ceramic sheet; treating the ceramic sheet with a mixed slurry of oxidation catalysts and inorganic binders so that the oxidation catalysts and the inorganic binders are supported on the surface of the ceramic fibers and in the interstices between the ceramic fibers; and calcining the ceramic sheet so treated.

In a preferred embodiment, the above-mentioned method further comprises the step of providing vent holes for the passage of exhaust gases in the crude ceramic sheet.

In a preferred embodiment, the above-mentioned method further comprises the steps of joining a corrugated ceramic sheet and a plain ceramic sheet with inorganic binders, the ceramic sheets having been treated with the mixed slurry of the oxidation catalysts and the inorganic binders; and forming a honeycomb structure by heaping up or rolling up the joined sheets.

Another method for preparing a catalytic composite for purifying exhaust gases of this invention, comprises the steps of making a crude ceramic sheet from a mixed slurry of ceramic fibers, oxidation catalysts and, inorganic binders by the use of a paper-making method; and calcining the crude ceramic sheet.

In a preferred embodiment, the above-mentioned method further comprises the step of providing vent holes for the passage of exhaust gases in the crude ceramic sheet.

In a preferred embodiment, the above-mentioned method further comprises the steps of joining a corrugated ceramic sheet and a plain ceramic sheet with inorganic binders, the ceramic sheets having been obtained by calcining the crude ceramic sheets; forming a honeycomb structure by heaping up or rolling up the joined sheets; and calcining the honeycomb structure.

Thus, the invention described herein makes possible the objectives of (1) providing a catalytic composite for purifying exhaust gases wherein the performance of the catalytic composite is improved and prevented from lowering, by selecting the variety, composition, and structure of the materials constituting the catalytic composite; (2) providing a catalytic composite for purifying exhaust gases with high reliability, which is porous so that the dropout of catalyst components can be prevented; and (3) providing a method for preparing a catalytic composite for purifying exhaust gases which can attain the preparation at low cost with high productivity by simplifying the steps of preparing the catalytic composite for purifying exhaust gases.

The catalytic composite for purifying exhaust gases of this invention is placed in the stream of exhaust gases containing unburnt combustion gas and carbon monoxide. The catalytic composite is heated to a temperature at which it can achieve catalytic action. The unburnt combustion gas and carbon monoxide in the exhaust gases passing through the heated catalytic composite are brought into contact with oxygen in the exhaust gases on the catalyst surface, and then converted into carbon dioxide and steam by oxidation reaction.

In the catalytic composite for purifying exhaust gases of this invention, the ceramic fibers constitute the skeleton of the catalytic composite, so that the structure thereof is porous. The oxidation catalyst is present not only on the surface of the ceramic fibers but also in the interstices between the ceramic fibers. Since the catalytic composite for purifying exhaust gases is porous, the exhaust gases can also diffuse into the inside of the catalytic composite. Therefore, the oxidation reaction by the oxidation catalyst takes place not only on the surface but also in the inside of the catalytic composite. In other words, the catalytic composite for purifying exhaust gases of this invention has a wide area with the catalytic function, so that a high catalytic activity can be obtained.

Also, since the oxidation catalyst is disposed in the reticular structure of the ceramic fibers together with the binder, the adhesion of the oxidation catalyst becomes high. Therefore, the dropout of the oxidation catalyst can be prevented, and the lowering of catalytic performance caused by the dropout can be prevented.

Moreover, since the catalytic composite for purifying exhaust gases of this invention is porous, the thermal capacity thereof is small. Hence, it takes only a short time to heat the catalytic composite to a temperature at which it can achieve catalytic action, and the energy required for heating may be saved.

The method for preparing a catalytic composite for purifying exhaust gases of this invention has the advantages that a step of forming a coating layer for providing a wider surface area is not required; and the formation of a ceramic structure as a catalyst carrier and the supporting of catalyst can be done in one step.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

The invention will be further explained below by reference to the following examples and accompanying drawings.

Figure 1:
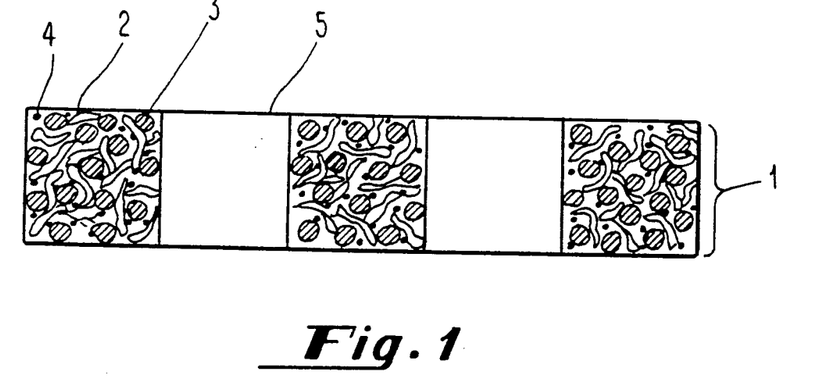
FIG. 1 is a sectional view showing a catalytic composite for purifying exhaust gases Of this invention.

FIG. 1 shows a catalytic composite for purifying exhaust gases of this invention. The catalytic composite is formed into a catalytic plate 1, which comprises ceramic fibers 2, oxidation catalysts 3, and inorganic binders 4. The catalytic plate 1 is provided with vent holes 5 for the passage of exhaust gases.

The catalytic plate 1 can be prepared by the following two preparation methods.

Preparation Method 1

First, ceramic fibers 2 and organic binders are sufficiently mixed together, and a solvent is then added to make a slurry with an appropriate coefficient of viscosity. From this slurry, a crude ceramic sheet is formed by the use of a paper-making method. After drying, the dried crude ceramic sheet is provided with vent holes 5 for the passage of exhaust gases by a technique such as punching. The crude ceramic sheet provided with the vent holes 5 is then calcined at the decomposition temperature of the organic binders to form a ceramic sheet. Next, oxidation catalysts 3 and inorganic binders 4 are sufficiently mixed together, and water is then added to make a mixed slurry with an appropriate coefficient of viscosity. This mixed slurry is applied to the ceramic sheet by means of, for example, brush or roller, or by immersion. At this time, the oxidation catalysts 3 are supported on the surface of the ceramic fibers 2 constituting the ceramic sheet and in the interstices between the ceramic fibers 2. By drying and calcining it, a catalytic plate 1 is prepared.

The vent holes 5 may be formed at any step, for example, after drying the crude ceramic sheet, after forming the ceramic sheet, after allowing the oxidation catalysts 3 and inorganic binders 4 to be supported on the ceramic sheet, or after preparing the catalytic plate 1. Most preferred is after drying the crude ceramic sheet.

This is because the opening is easy and the dimensional precision is high.

As described above, the ceramic sheet is prepared by calcining at the decomposition temperature of the organic binders. At this time, since the organic binders are removed from the ceramic sheet, the ceramic sheet has a porous structure made only of the ceramic fibers.

According to this preparation method, since the oxidation catalysts 3 and inorganic binders 4 are supported in the porous ceramic sheet with a porous structure, they are present in the inside as well as the apparent surface. That is, the catalytic plate 1 is in a mixed state of the ceramic fibers 2, the oxidation catalysts 3, and the inorganic binders 4. Moreover, the catalytic plate 1 may be made into a porous structure in which exhaust gases can be diffused, by controlling the amount of oxidation catalysts to be supported.

Preparation Method 2

First, ceramic fibers 2, oxidation catalysts 3, and inorganic binder 4 are sufficiently mixed together, and a solvent is added to make a slurry with an appropriate coefficient of viscosity. From this slurry, a crude ceramic sheet is formed by the use of a paper-making method. The crude ceramic sheet is provided with vent holes 5 for the passage of exhaust gases by a technique such as punching. By calcining it, a catalytic plate 1 is prepared.

The vent holes 5 may be formed at any step, either after drying the crude ceramic sheet or after preparing the catalytic plate 1. Most preferred is after drying the crude ceramic sheet. This is because the opening is easy and the dimensional precision is high.

According to this preparation method, since the catalytic plate 1 is made of a mixed slurry of the ceramic fibers 2, the oxidation catalysts 3, and the inorganic binders 4, these components are in a mixed state after the calcination. Moreover, the catalytic plate 1 may be made into a porous structure in which exhaust gases can be diffused, by controlling the amount of oxidation catalysts to be supported. In order to make the catalytic plate 1 more porous, it is also possible that organic binders are added to the mixed slurry and the crude ceramic sheet formed is calcined at the decomposition temperature of the organic binders.

The content of the oxidation catalysts 3 in the catalytic plate 1 is preferably in the range of 20 to 50 wt %. When the content of the oxidation catalysts 3 is less than 20 wt %, the catalytic performance becomes poor or the mechanical strength as a catalytic composite becomes weak. When the content is greater than 50 wt %, the adhesion of the oxidation catalysts 3 becomes poor, so that the dropout thereof is likely to occur, and since the catalytic composite becomes high in density, the surface area with the catalytic function decreases, which may result in poor catalytic performance.

The solid content of the inorganic binders 4 to the content of the oxidation catalysts 3 is preferred to be in the range of 5 to 10 wt %. This is because the inorganic binders 4 are used for the purpose of binding the oxidation catalysts 3 to the ceramic fibers 2, and it should be used in an amount as small as possible from the viewpoint of the catalytic performance.

The material of the ceramic fibers 2 is at least one of alumina and silica, and the fiber diameter is preferably from 1 to 5 $\mu$m. This is because the catalytic composite for purifying exhaust gases requires a high heat resistance, and the formation of the crude ceramic sheet becomes easier.

As the material of the oxidation catalysts 3, a metal oxide is desired, and in particular, it is desired that the oxidation catalysts 3 are made of at least one selected from the group consisting of perovskite-type compound oxides of the formula $ABO_3$, where A is selected from the group consisting of lanthanum (La), strontium (Sr), and cerium (Ce), and B is selected from the group consisting of cobalt (Co) and manganese (Mn)., delafosite-type compound oxides of the formula $ABO_2$ wherein A is copper (Cu) and B is selected from the group consisting of cobalt (Co) and manganese (Mn), and other oxides containing Cu, Mn, and/or Co. These oxidation catalysts 3 are selected depending on the volume and temperature of exhaust gases, catalytic performance, and other required conditions as a catalyst.

The material of the inorganic binders 4 can preferably be colloidal particles made of silica, alumina, or zirconia. They are recommended for the sake of excellent heat resistance.

The material of the organic binders used in the preparation method 1 is not particularly limited as far as it can be decomposed and removed at low temperatures.

The size of the vent holes 5 for the passage of exhaust gases is freely set depending on the operating conditions such as a flow rate of exhaust gases, pressure loss, temperature, and size of catalytic composite.

The following will describe the function of the catalytic composite for purifying exhaust gases of this example.

The catalytic plate 1 as the catalytic composite for purifying exhaust gases is placed in the stream of exhaust gases containing unburnt combustion gas and carbon monoxide, which are released from automobiles, combustion equipments, cooking utensils, etc. The catalytic plate 1 is heated to a temperature at which it can achieve catalytic action. In the exhaust gases passing through the heated catalytic plate 1, hydrocarbon and carbon monoxide are brought into contact with the oxidation catalysts 3 percent in the catalytic plate 1, together with oxygen in the exhaust gases. As a result, the hydrocarbon and carbon monoxide are converted into carbon dioxide and steam by the oxidation reaction of the catalyst, which are then discharged through the vent holes 5.

The oxidation catalysts 3 are present not only on the surface of the catalytic plate 1 but also in the interstices between the ceramic fibers 2 constituting the skeleton of the catalytic plate 1. Moreover, since the catalytic plate 1 has a porous structure, the exhaust gases can also diffuse into the inside thereof. As a result, the oxidation reaction of the catalyst takes place not only on the surface of the catalytic plate 1 but also in the inside of the catalytic plate 1. That is, the catalytic composite for purifying exhaust gases of this invention, which is formed into a catalytic plate 1, has a wider area with the catalytic function, thereby attaining a high catalyst activity.

The catalytic composite for purifying exhaust gases of this invention is porous and is hence small in thermal capacity. As a result, it takes only a short time to heat the catalytic composite for purifying exhaust gases to a temperature at which it can achieve the catalytic action, so that the energy required for heating can be saved.

Moreover, since the catalytic composite for purifying exhaust gases of this invention has a high catalyst activity, the temperature at which it can achieve the catalytic action can be lowered.

The method for preparing a catalytic composite for purifying exhaust gases of this invention has the advantages that a step for forming a coating layer for providing a wider surface area is not required; the formation of a ceramic structure as a catalyst carrier and the supporting of catalyst can be done in one step. That is, the preparation process can be simplified as compared with the conventional process. As a result, the catalytic composite for purifying exhaust gases can be prepared at low cost with high productivity. Moreover, since noble metals such as platinum and rhodium are not used as the oxidation catalyst, the cost can be further lowered.

The following will describe other examples of the catalytic composite prepared by the foregoing two preparation methods.

Figure 2:
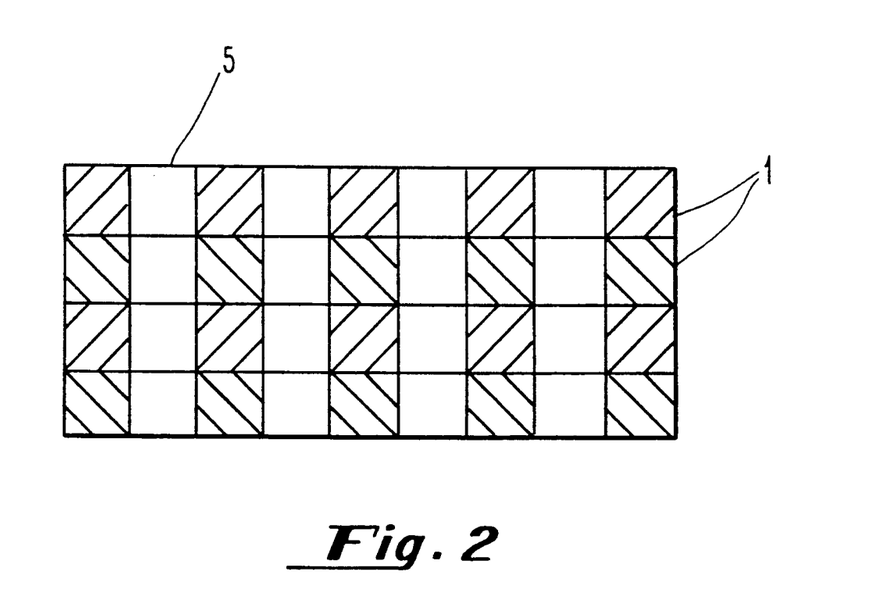
FIG. 2 is a sectional view showing another catalytic composite for purifying exhaust gases of this invention, which is composed of a plurality of the catalytic composites as shown in FIG. 1 and is prepared by the same method as used for the catalytic composite shown in FIG. 1.

As shown in FIG. 2, the catalytic composite for purifying exhaust gases is composed of a plurality of catalytic plates 1 so that vent holes 5 communicate with each other.

Since the catalytic plate 1 of this invention is prepared by the use of a paper-making method, the thickness thereof is about 0.1 to 1 mm. Therefore, when the flow rate of exhaust gases is increased or when the area of the catalytic composite must be reduced, the load is too much for a single catalytic plate 1 with such a thickness, so that the exhaust gases cannot be purified completely. To solve this problem, the catalytic composite for purifying exhaust gases of this example is formed to have an increased thickness by heaping up a plurality of catalytic plates 1 so that the vent holes 5 communicate with each other. As a result, the catalytic composite for purifying exhaust gases of this example can attain excellent catalytic performance.

The catalytic composite for purifying exhaust gases of this example is formed by heaping up a plurality of the catalytic plates 1 and joining them to each other with inorganic binders. The inorganic binders may be the same as those used in the preparation of the catalytic plate 1. The number of the catalytic plates 1 to be joined is determined by the processing condition of the exhaust gases.

Figure 3:
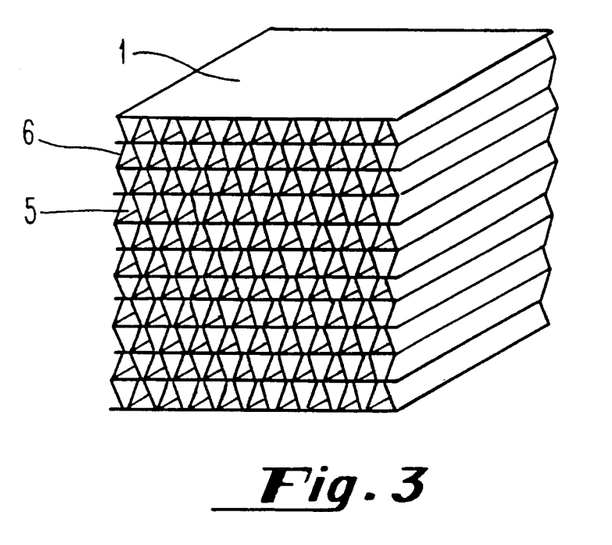
FIG. 3 is a perspective view showing still another catalytic composite for purifying exhaust gases of this invention, which has a honeycomb structure in the form of rectangular parallelepiped and is prepared by a method different from that used for the catalytic composites as shown in FIGS. 1 and 2.
Figure 4:
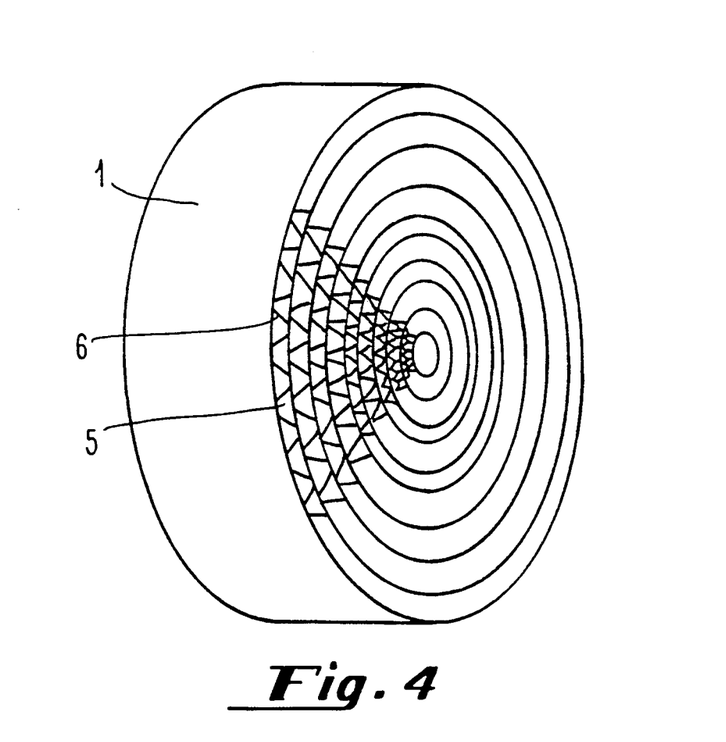
FIG. 4 is a perspective view showing still another catalytic composite for purifying exhaust gases of this invention, which has a cylindrical honeycomb structure and is prepared by the same method as used for the catalytic composite shown in FIG. 3.

The following will describe other examples of the catalytic composite for purifying exhaust gases prepared by preparation methods which are different from those used in the foregoing two examples by reference to FIGS. 3 and 4.

In FIGS. 3 and 4, reference numeral 6 is a corrugated catalytic plate. This corrugated catalytic plate 6 is made of the same material as that of the catalytic plate 1 in the foregoing examples. The vent holes 5 for the passage of exhaust gases are formed by joining the catalytic plate 1 and the corrugated catalytic plate 6. The catalytic composite for purifying exhaust gases with a honeycomb structure can be obtained by heaping up plural pairs of the catalytic plate 1 and the corrugated catalytic plate 6 as shown in FIG. 3, or by rolling up the catalytic plate 1 and the corrugated catalytic plate 6 as shown in FIG. 4.

The catalytic composites for purifying exhaust gases of these examples can be prepared by the following two preparation methods.

Preparation Method 3

First, ceramic fibers 2 and organic binders, are sufficiently mixed together and a solvent is added to form a slurry with an appropriate coefficient of viscosity. From this mixed slurry, a crude ceramic sheet is formed by the use of a paper-making method. After drying, the dried crude ceramic sheet is calcined at the decomposition temperature of the organic binders, resulting in a ceramic sheet. Next, oxidation catalysts 3 and inorganic binders 4 are sufficiently mixed together, and water is added to form a mixed slurry with an appropriate coefficient of viscosity. This mixed slurry is applied to the ceramic sheet by means of, for example, brush or roller, or by immersion, after which the ceramic sheet is dried. At this time, the oxidation catalysts 3 are supported not only on the surface of the ceramic fibers 2 constituting the ceramic sheet but also in the interstices between the ceramic fibers 2. The ceramic sheet with the oxidation catalysts 3 supported is corrugated by means of a corrugator. The corrugated and uncorrugated plain ceramic sheets are joined to each other with inorganic binders. The joined sheets are used as a pair, and plural pairs are heaped up or rolled up, and then calcined, thereby obtaining a catalytic composite for purifying exhaust gases with a honeycomb structure.

Preparation Method 4

First, ceramic fibers 2, oxidation catalysts 3, and inorganic binders 4 are sufficiently mixed together, and a solvent is added to form a slurry with an appropriate coefficient of viscosity. From this slurry, a crude ceramic sheet is formed by the use of a paper-making method. After drying, the crude ceramic sheet is calcined at low temperatures, resulting in a ceramic sheet. This ceramic sheet is corrugated by means of a corrugator. The corrugated and uncorrugated plain ceramic sheets are joined to each other with inorganic binders. The joined sheets are used as a pair, plural pairs are heaped up or rolled up, and then calcined, thereby obtaining a catalytic composite for purifying exhaust gases with a honeycomb structure.

When the corrugated and uncorrugated plain ceramic sheets are joined to each other, and then heaped up or rolled up, inorganic binders are used. The inorganic binders may be the same as those used in the supporting of the oxidation catalysts 3. The number of laminated sheets, the number of times for rolling, and the size of vent holes 5 are determined by the processing conditions of exhaust gases.

The catalytic composites for purifying exhaust gases with a honeycomb structure prepared by the preparation methods 3 and 4 are more practical than those prepared by the preparation methods 1 and 2. This is because the catalytic composite for purifying exhaust gases with a honeycomb structure can readily be designed and prepared to have a shape and size suitable for the processing conditions of exhaust gases.

The catalytic composites for purifying exhaust gases with a honeycomb structure prepared by the preparation methods 3 and 4 have the same constitution of materials, function, and advantages as those of the catalytic composites for purifying exhaust gases prepared by the preparation methods 1 and 2.

In the foregoing examples, when a higher catalytic activity is required, a small amount of noble metals such as platinum or rhodium may be supported on the catalytic composite for purifying exhaust gases.

The following will describe practical experimental examples of the catalytic composite for purifying exhaust gases of this invention.

Experimental Example 1

A catalytic composite for purifying exhaust gases with a structure as shown in FIG. 1 was prepared by the use of the preparation method 1. The materials, composition, and shape used in the preparation of this catalytic composite for purifying exhaust gases are as follows:

(1) Constituent materials and composition of catalytic plate 1

| (a) | Ceramic fibers 2 Alumina-silica fiber | 50 wt % |
| --- | --- | --- |
| (b) | Oxidation catalysts 3 $CuO$, $MnO_2$, $Co_3O_4$ metal oxide | 45 wt % |
| (c) | Inorganic binders 4 Alumina sol (solid content) | 5 wt % |

(2) Thickness of catalytic plate 1
1 mm
a(3) Size and number of vent holes 5
Diameter 0.7 mm, 200 holes/inch$^2$
An acrylic resin was used as an organic binder.

For the catalytic composite for purifying exhaust gases prepared in this way (i.e., catalytic plate 1), the conversion was evaluated by gas chromatography using a tubular flow system reactor and one kind of gas containing carbon monoxide at a concentration of 0.1% (air balance), under the condition of space velocity of 2000 hr$^{-1}$. As a result, the conversion of 90% or more was obtained at 250° C.

Experimental Example 2

A catalytic composite for purifying exhaust gases with a structure as shown in FIG. 2 was prepared by the use of the preparation method 1. The materials, composition, and shape used in the preparation of this catalytic composite for purifying exhaust gases are as follows:

(1) Constituent materials and composition of catalytic plate 1

| (a) | Ceramic fibers 2 Alumina-silica fiber | 75 wt % |
| --- | --- | --- |
| (b) | Oxidation catalysts 3 Delafosite-type compound oxide $CuMnO_2$ | 23 wt % |
| (c) | Inorganic binders 4 Silica sol (solid content) | 2 wt % |

(2) Thickness of catalytic plate 1
10 mm
(ten pieces of catalytic plate 1 were joined together)
(3) Size and number of vent holes 5
Diameter 1 mm, 200 holes/inch$^2$
An acrylic resin was used as an organic binder.

The catalytic composite for purifying exhaust gases, the conversion was evaluated by gas chromatography using a tubular flow system reactor and two kinds of gases containing carbon monoxide at a concentration of 0.1% (air balance) or propylene at a concentration of 1% (air balance) under the condition of space velocity of 10,000 hr$^{-1}$. As a result, the conversion of 90% or more was obtained at 180° C. for carbon monoxide and at 240° C. for propylene. Moreover, when another delafosite-type compound oxide $CuCoO_2$ was used as the oxidation catalyst 3, similar results were obtained.

Experimental Example 3

A catalytic composite for purifying exhaust gases with a structure as shown in FIG. 2 was prepared by the use of the preparation method 2. The materials, composition, and shape used in the preparation of this catalytic composite for purifying exhaust gases are as follows:

(1) Constituent materials and composition of catalytic plate 1

| (a) | Ceramic fibers 2 Alumina-silica fiber | 75 wt % |
| --- | --- | --- |
| (b) | Oxidation catalysts 3 Delafosite-type compound oxide $CuMnO_2$ | 23 wt % |
| (c) | Inorganic binders 4 Silica sol (solid content) | 2 wt % |

(2) Thickness of catalytic plate 1
10 mm
(ten pieces of catalytic plate 1 were joined together)
(3) Size and number of vent holes 5
Diameter 1 mm, 200 holes/inch$^2$
An acrylic resin was used as an organic binder.

The catalytic composite for purifying exhaust gases, the conversion was evaluated by gas chromatography using a tubular flow system reactor and two kinds of gases containing carbon monoxide at a concentration of 0.1% (air balance) or propylene at a concentration of 1% (air balance) under the condition of space velocity of 10,000 hr$^{-1}$. As a result, the conversion of 90% or more was obtained at 180° C. for carbon monoxide and at 240° C. for propylene.

Experimental Example 4

A catalytic composite for purifying exhaust gases with a structure as shown in FIG. 3 was prepared by the use of the preparation method 3. The materials, composition, and shape used in the preparation of this catalytic composite for purifying exhaust gases are as follows:

(1) Constituent materials and composition of catalytic composite for purifying exhaust gases (i.e., catalytic plate 1 and corrugated catalytic plate 6)

| (a) | Ceramic fibers 2 Alumina-silica fiber | 50 wt % |
| --- | --- | --- |
| (b) | Oxidation catalysts 3 Perovskite-type compound oxide $La_{0.9}Ce_{0.1}CoO_3$ | 45 wt % |
| (c) | Inorganic binders 4 Alumina sol (solid content) | 5 wt % |

(2) Thickness of catalytic plate 1 and corrugated catalytic plate 6
0.3 mm
(3) Size and number of vent holes 5 200 holes/inch$^2$
An acrylic resin was used as an organic binder.

For the catalytic composite for purifying exhaust gases prepared in this way, the conversion was evaluated by gas chromatography using a tubular flow system reactor and two kinds of gases containing carbon monoxide at a concentration of 0.1% (air balance) or methane at a concentration of 1% (air balance) under the condition of space velocity of 10,000 hr$^{-1}$. As a result, the conversion of 90% or more was obtained at 260° C. for carbon monoxide and at 650° C. for methane.

When another perovskite-type compound oxide $La_{0.8}Sr_{0.2}Co_{0.9}Mn_{0.1}O_3$ was used as the oxidation catalysts 3, similar results were obtained.

Experimental Example 5

A catalytic composite for purifying exhaust gases with a structure as shown in FIG. 3 was prepared by the use of the preparation method 4. The materials, composition, and shape used in the preparation of this catalytic composite for purifying exhaust gases are as follows:

(1) Constituent materials and composition of catalytic composite for purifying exhaust gases (i.e., catalytic plate 1 and corrugated catalytic plate 6)

| (a) | Ceramic fibers 2 Alumina-silica fiber | 50 wt % |
| --- | --- | --- |
| (b) | Oxidation catalysts 3 Perovskite-type compound oxide $La_{0.9}Ce_{0.1}CoO_3$ | 45 wt % |
| (c) | Inorganic binders 4 Alumina sol (solid content) | 5 wt % |

(2) Thickness of catalytic plate 1 and corrugated catalytic plate 6
0.3 mm
(3) Size and number of vent holes 5
200 holes/inch$^2$
An acrylic resin was used as an organic binder.

For the catalytic composite for purifying exhaust gases prepared in this way, the conversion was evaluated by gas chromatography using a tubular flow system reactor and two kinds of gases containing carbon monoxide at a concentration of 0.1% (air balance) or methane at a concentration of 1% (air balance) under the condition of space velocity of 10,000 hr$^{-1}$. As a result, the conversion of 90% or more was obtained at 260° C. for carbon monoxide and at 650° C. for methane.

Experimental Example 6

A catalytic composite for purifying exhaust gases with a structure as shown in FIG. 4 was prepared by the use of the preparation method 3. The materials, composition, and shape used in the preparation of this catalytic composite for purifying exhaust gases are as follows:

(1) Constituent materials and composition of catalytic composite for purifying exhaust gases (i.e., catalytic plate 1 and corrugated catalytic plate 6)

| (a) | Ceramic fibers 2 Alumina-silica fiber | 60 wt % |
| --- | --- | --- |
| (b) | Oxidation catalysts 3 $CuO$, $MnO_2$, $Co_3O_4$ metal oxide | 36 wt % |
| (c) | Inorganic binders 4 Zirconia sol (solid content) | 4 wt % |

(2) Thickness of catalytic plate 1 and corrugated catalytic plate 6
0.3 mm
(3) Size and number of vent holes 5
200 holes/inch$^2$
An acrylic resin was used as an organic binder.

The catalytic composite for purifying exhaust gases, the conversion was evaluated by gas chromatography using a tubular flow system reactor and two kinds of gases containing carbon monoxide at a concentration of 0.1% (air balance) or propylene at a concentration of 1% (air balance) under the condition of space velocity of 10,000 hr$^{-1}$. As a result, the conversion of 90% or more was obtained at 150° C. for carbon monoxide and at 200° C. for propylene. Moreover, when metal oxides such as $CuO$, $MnO_2$, and $Co_3O_4$ were used alone or a combination of these two metal oxides was used as the oxidation catalysts 3, similar results were obtained for $CuO$ and $MnO_2$, whereas $Co_3O_4$ yielded more excellent results.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A catalytic composite for purifying exhaust gases comprising a ceramic sheet consisting essentially of ceramic fibers, oxidation catalysts supported on the surface of said ceramic fibers and in the interstices between said ceramic fibers, and inorganic binders for binding said oxidation catalysts to said ceramic fibers, said ceramic sheet having vent holes for the passage of exhaust gases, said oxidation catalysts being present in an amount effective to purify exhaust gases by oxidation thereof, wherein said oxidation catalysts comprise perovskite compound oxides of the formula $ABO_3$, wherein A is selected from the group consisting of lanthanum (La), strontium (Sr) and cerium (Ce), and B is selected from the group consisting of cobalt (Co) and manganese (Mn).

2. A catalytic composite for purifying exhaust gases comprising a honeycomb structure formed from a corrugated ceramic sheet and a plain ceramic sheet joined with inorganic binders composed mainly of at least one selected from the group consisting of alumina, silica and zirconia, said ceramic sheets consisting essentially of ceramic fibers, oxidation catalysts supported on the surface of said ceramic fibers and in the interstices between said ceramic fibers, and inorganic binders for binding said oxidation catalysts to said ceramic fibers, said oxidation catalysts being present in an amount effective to purify exhaust gases by oxidation thereof, wherein sad oxidation catalysts comprise perovskite compound oxides of the formula $ABO_3$, where A is selected from the group consisting of lanthanum (La), strontium (Sr) and cerium (Ce), and B is selected from the group consisting of cobalt (Co) and manganese (Mn).

3. A catalytic composite for purifying exhaust gases according to claim 1, wherein said ceramic fibers are made of at least one selected from the group consisting of alumina and silica.

4. A catalytic composite for purifying exhaust gases according to claim 1, wherein said inorganic binders are composed mainly of at least one selected from the group consisting of alumina, silica, and zirconia.

5. A method for preparing a catalytic composite for purifying exhaust gases, comprising the steps of making a crude ceramic sheet from a mixed slurry consisting essentially of ceramic fibers and organic binders by the use of a paper-making method, calcining said crude ceramic sheet at the decomposition temperature of said organic binders to form a ceramic sheet; treating said ceramic sheet with a mixed slurry or oxidation catalysts and inorganic binders so that the oxidation catalysts and the inorganic binders are supported on the surface of said ceramic fibers and in the interstices between said ceramic fibers; and calcining the ceramic sheet so treated.

6. A method for preparing a catalytic composite for purifying exhaust gases according to claim 5, further comprising the step of providing vent holes for the passage of exhaust gases in said crude ceramic sheet.

7. A method for preparing a catalytic composite for purifying exhaust gases according to claim 5, further comprising the steps of joining a corrugated ceramic sheet and a plain ceramic sheet with inorganic binders, said ceramic sheets having been treated with said mixed slurry of the oxidation catalysts and the inorganic binders; and forming a honeycomb structure by heaping up or rolling up said joined sheets.

8. A method for preparing a catalytic composite for purifying exhaust gases, comprising the steps of making a crude ceramic sheet from a mixed slurry consisting essentially of ceramic fibers, oxidation catalysts and inorganic binders by the use of a paper-making method; providing vent holes for the passage of exhaust gases in said crude ceramic sheet; and calcining said crude ceramic sheet.

9. A method for preparing a catalytic composite for purifying exhaust gases, comprising the steps of making crude ceramic sheets from a mixed slurry consisting essentially of ceramic fibers, oxidation catalysts and inorganic binders by the use of a paper-making method; joining a corrugated ceramic sheet and a plain ceramic sheet with inorganic binders composed mainly of at least one selected from the group consisting of alumina, silica and zirconia, said ceramic sheets having been obtained by calcining said crude ceramic sheets; forming a honeycomb structure by heaping up or rolling up sad joined sheets; and calcining said honeycomb structure.

10. A catalytic composite for purifying exhaust gases comprising a ceramic sheet consisting essentially of ceramic fibers, oxidation catalysts supported on the surface of said ceramic fibers and in the interstices between said ceramic fibers, and inorganic binders for binding said oxidation catalysts to said ceramic fibers, said ceramic sheet being provided with vent holes for the passage of exhaust gases, said oxidation catalysts being present in an amount effective to purify exhaust gases by oxidation thereof, wherein said oxidation catalysts comprise delafosite compound oxides of the formula $ABO_2$, wherein A is copper (Cu) and B is selected from the group consisting of cobalt (co) and manganese (Mn).

11. A catalytic composite for purifying exhaust gases comprising a honeycomb structure formed from a corrugated ceramic sheet and a plain ceramic sheet joined with inorganic binders composed mainly of at least one selected from the group consisting of alumina, silica and zirconia, said ceramic sheets consisting essentially of ceramic fibers, oxidation catalysts supported on the surface of said ceramic fibers and in the interstices between said ceramic fibers, and inorganic binders for binding said oxidation catalysts to said ceramic fibers, said oxidation catalysts being present in an amount effective to purify exhaust gases by oxidation thereof, wherein said oxidation catalysts comprise delafosite compound oxides of the formula $ABO_2$, wherein A is copper (Cu) and B is selected from the group consisting of cobalt (Co) and manganese (Mn).

12. A catalytic composite for purifying exhaust gases according to claim 10, wherein said ceramic fibers are made of at least one selected from the group consisting of alumina and silica.

13. A catalytic composite for purifying exhaust gases according to claim 10, wherein said inorganic binders are composed mainly of at least one selected from the group consisting of alumina, silica, and zirconia.

14. A catalytic composite of purifying exhaust gases comprising a ceramic sheet consisting essentially of ceramic fibers, oxidation catalysts supported on the surface of said ceramic fibers and in the interstices between said ceramic fibers, and inorganic binders for binding said oxidation catalysts to said ceramic fibers, said ceramic sheet having vent holes for the passage of exhaust gases, said oxidation catalysts being present in an amount effective to purify exhaust gases by oxidation thereof, wherein said oxidation catalysts comprise a metal oxide of manganese (Mn) or a mixture of at least two metal oxides of cooper (Cu), manganese (Mn), and cobalt (Co).

15. A catalystic composite for purifying exhaust gases comprising a honeycomb structure formed from a corrugated ceramic sheet and a plain ceramic sheet joined with inorganic binders composed mainly of at least one selected from the group consisting of alumina, silica and zirconia, said ceramic sheets consisting essentially of ceramic fibers, oxidation catalysts supported on the surface of said ceramic fibers and in the interstices between said ceramic fibers, and inorganic binders for binding said oxidation catalysts to said ceramic fibers, said oxidation catalysts being present in an amount effective to purify exhaust gases by oxidation thereof, wherein said oxidation catalysts comprise a metal oxide of manganese (Mn) or a mixture of at least two metal oxides of copper (Cu), manganese (Mn) and cobalt (Co).

16. A catalytic composite for purifying exhaust gases according to claim 14, wherein said ceramic fibers are made of at least one selected from the group consisting of alumina and silica.

17. A catalytic composite for purifying exhaust gases according to claim 14, wherein said inorganic binders are composed mainly of at least one selected from the group consisting of alumina, silica, and zirconia.

18. A catalytic composite for purifying exhaust gases according to claim 2, wherein said ceramic fibers are made of at least one selected from the group consisting of alumna and silica.

19. A catalytic composite for purifying exhaust gases according to claim 2, wherein said inorganic binders for binding said oxidation catalysts to said ceramic fibers are composed mainly of at least one selected from the group consisting of alumina, silica and zirconia.

20. A catalytic composite for purifying exhaust gases according to claim 11, wherein said ceramic fibers are made of at least one selected from the group consisting of alumina and silica.

21. A catalytic composite for purifying exhaust gases according to claim 11, wherein said inorganic binders for binding said oxidation catalysts to said ceramic fibers are composed mainly of at least one selected from the group consisting of alumina, silica and zirconia.

22. A catalytic composite for purifying exhaust gases according to claim 15, wherein said ceramic fibers are made of at least one selected from the group consisting of alumina and silica.

23. A catalytic composite for purifying exhaust gases according to claim 18, wherein said inorganic binders for binding said oxidation catalysts to said ceramic fibers are composed mainly of at least one selected from the group consisting of alumina, silica and zirconia.

* * * * *

UNITED STATES PATENT AND TRADEMARK OFFICE
CERTIFICATE OF CORRECTION

PATENT NO. : 5,057,482

DATED : October 15, 1991

INVENTOR(S) : Fukuda et al.

It is certified that error appears in the above-identified patent and that said Letters Patent is hereby corrected as shown below:

Column 2, line 27, "$ABQ_2$" should read --$ABO_2$--;

Column 4, line 8, "Of" should read --of--.

Claim 10, column 13, line 49, "cobalt(co)" should read --cobalt(Co)--.

Claim 14, column 14, line 18, "cooper(Cu)" should read --copper(Cu)--.

Claim 18, column 14, line 44, "alumna" should read --alumina--.

Signed and Sealed this

Twenty-second Day of June, 1993

Attest:

MICHAEL K. KIRK

*Attesting Officer*   Acting Commissioner of Patents and Trademarks